Sept. 9, 1952 A. K. ARTHUR 2,609,872
AUTOMOBILE SCREEN
Filed June 30, 1951 2 SHEETS—SHEET 1

INVENTOR
ARNOLD K ARTHUR
BY Harold E. Stonebraker
ATTORNEY

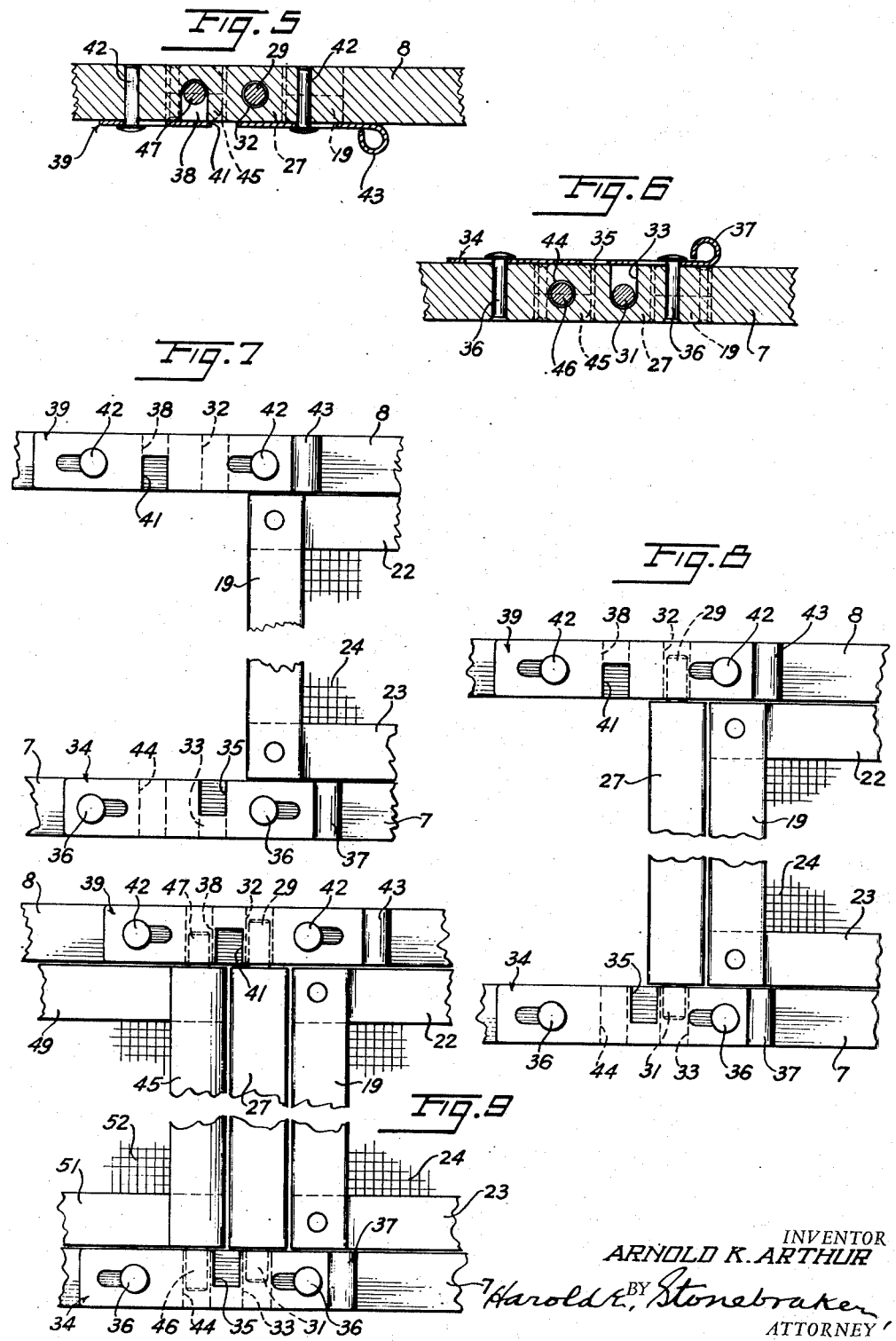

Patented Sept. 9, 1952

2,609,872

UNITED STATES PATENT OFFICE 2,609,872

AUTOMOBILE SCREEN

Arnold K. Arthur, Rochester, N. Y.

Application June 30, 1951, Serial No. 234,635

10 Claims. (Cl. 160—183)

This invention relates to an automobile screen, and has for its purpose to provide an efficient, simple and practical screen structure for use in the open space of an automobile door when the vertically slidable glass window is lowered.

There is a serious hazard in driving an automobile with open windows resulting from bees and other insects flying into the car, and it is a purpose of this invention to afford a screen that can be economically manufactured and easily positioned in an automobile door so as to effectually prevent ingress of bees, mosquitoes, and other insects.

A more particular object of the invention is to provide a firm, rigid, and durable construction including a series of removable screen panels interlockingly related to a supporting frame that can be permanently secured within the door frame, enabling quick and ready positioning of the screen panels and their almost instant removal when it is not desired to use them.

An additional purpose of the invention is to afford a structure that completely screens the open space of an automobile door such as occupied by the windows when they are closed and which permits quick opening of one screen panel by swinging either inwardly or outwardly when the driver desires to project his arm for signaling.

Still another object of the invention is to provide a structure including one screen panel that permits partial opening of a pivoted window arranged at the front of the door opening in most conventional automobiles and adapted to swing about a vertical axis with a portion of the window extending inwardly and a portion extending outwardly from the door frame, the screen panel also being constructed to accommodate the locking means employed to lock the pivoted window.

A further purpose of the invention is to afford a construction comprising a supporting frame fixedly attached to the door frame and having a forward vertical rail that interlocks with the front and central screen panels, and a vertical locking post removably associated with the supporting frame and acting to impart strength and rigidity to the supporting frame and to hold the central screen panel in place in the supporting frame, while permitting the rear screen panel to be detachably associated with the supporting frame for pivotal movement therein.

To these and other ends, the invention consists in the construction and arrangement of parts that will appear clearly from the following description when read in conjunction with the accompanying drawings, the novel features being pointed out in the claims following the specification.

In the drawings:

Fig. 5 is an enlarged detail sectional view on line 5—5 of Fig. 1 showing the rear pivoted screen panel secured in operative position as in Fig. 1;

Fig. 6 is an enlarged detail sectional view on line 6—6 of Fig. 1 showing the removable locking post secured in operative position as in Fig. 1;

Fig. 7 is an enlarged side elevation, partially broken away, showing the central screen panel positioned in the supporting frame before assembling the locking post and rear pivoted screen panel, with both sliding catches in releasing position;

Fig. 8 is a view similar to Fig. 7 with the locking post and central screen panel interlocked and secured in operative position, and Fig. 9 is a view similar to Figs. 7 and 8 showing the rear pivoted screen panel secured in position as in Fig. 1, with both sliding catches in locking position.

Figure 1:
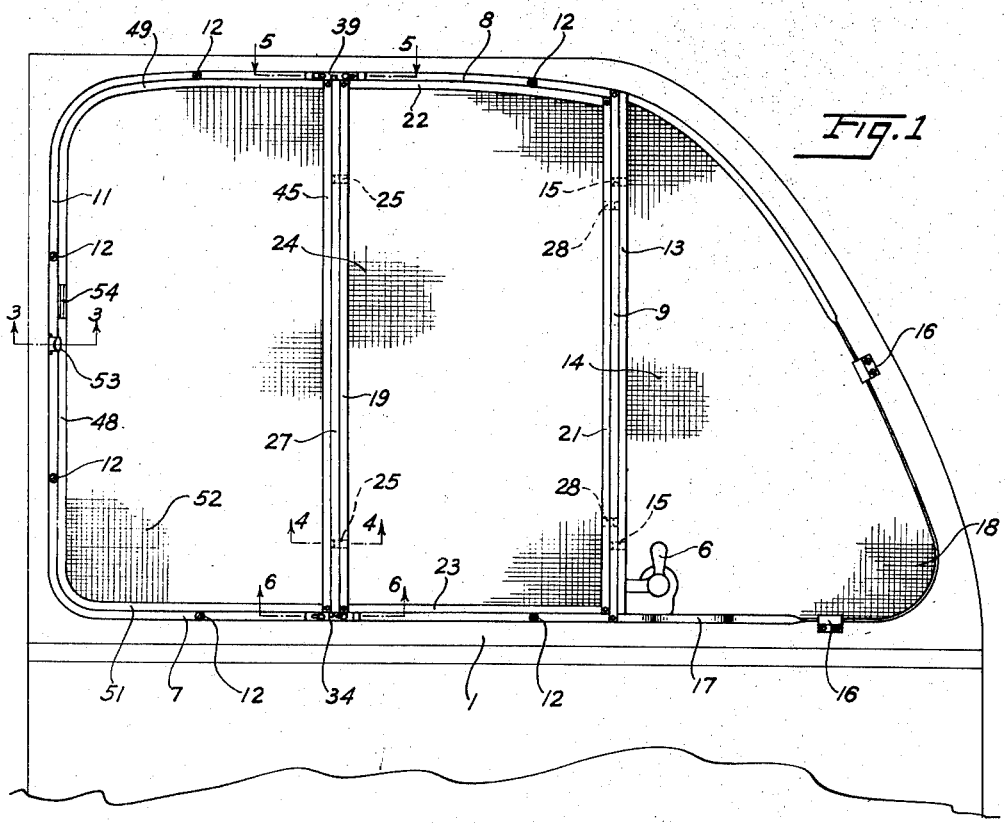
Fig. 1 is a view in side elevation illustrating one practical embodiment of the invention and showing it positioned in a conventional automobile door.
Figure 2:
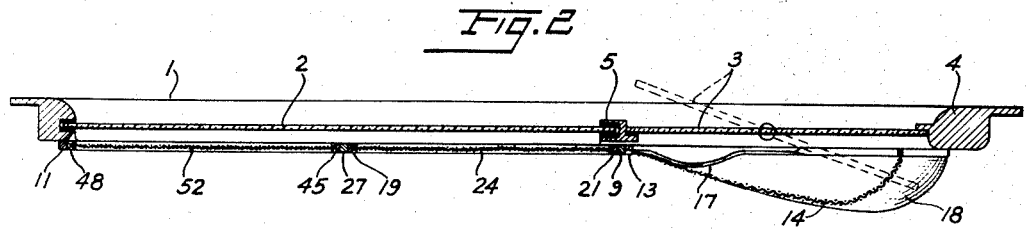
Fig. 2 is a horizontal sectional view of the same.
Figure 3:
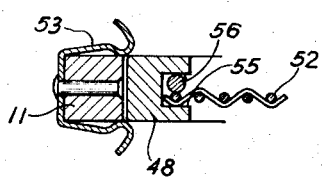
Fig. 3 is an enlarged detail sectional view on line 3—3 of Fig. 1 showing the rear pivoted screen panel in closed position as in Fig. 1.
Figure 4:
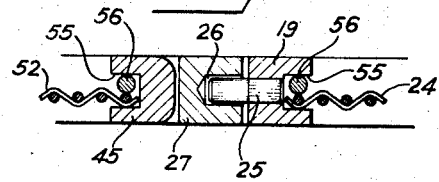
Fig. 4 is an enlarged detail sectional view on line 4—4 of Fig. 1 showing the relationship between the central screen panel, removable locking post, and rear pivoted screen panel.

Referring more particularly to the drawings in which like reference numerals refer to the same parts throughout the several views, 1 represents the frame of a conventional front door of an automobile within which are disposed the usual vertically sliding window 2 and the vertically pivoted front window 3, see Figs. 1 and 2, arranged between the front portion 4 of the door frame and the vertical portion 5, the front window 3 being provided with the conventional lock and handle 6 arranged on the inner face thereof at the bottom.

Arranged inside the door frame just described is a supporting frame preferably of aluminum, other metal, or other suitable material, and consisting of a bottom rail 7, top rail 8, and front and rear vertical rails 9 and 11 respectively, this metal supporting frame being permanently attached to the door frame in any suitable fashion as by means of screws 12 and affording means for detachably holding the several screen panels in position.

There are preferably three screen panels, namely a front screen panel interlocked with the front vertical rail 9 of the supporting frame and detachably connected to the door frame, a central screen panel interlocked with the front vertical rail 9 and with a locking post that is detachably locked in engagement with the supporting frame, and a rear screen panel that is detachably locked in the supporting frame in such a way as to permit its swinging movement either inwardly or outwardly, all as will now be described more fully.

The front screen panel includes a metallic frame 13 to which the sheet of screening wire or other material 14 is attached in any suitable manner, and 15 designate interlocking pins carried by the vertical portion of the front screen panel frame and adapted to enter openings in the vertical rail 9 of the supporting frame, while 16 designates a spring-catch attached to the door frame and arranged to yieldingly engage the forward portion of the metal frame of the front screen panel and to hold the latter in operative position. The bottom rail of the front screen panel frame is bowed inwardly as indicated at 17 to extend around the conventional locking element on the door frame for the vertically pivoted window 3, and the wire screening material 14 is bulged inwardly at 18 to permit the vertically pivoted window 3 to be swung to a partially open position as indicated in dotted lines in Fig. 2, thus affording screen protection for the opening occupied by the vertically pivoted window while at the same time permitting the latter to be moved to a partially open position. The front portion of the frame 13 is so formed as to permit the wire screening material to extend laterally away from the frame, as shown in Fig. 2, to provide the bulge 18.

The front screen panel is assembled by first inserting the locking pins 15 into the openings of the vertical rail 9 of the supporting frame by a rearward sliding motion and then pushing the forward part of the frame 13 of the screen panel outwardly toward the door frame until it is engaged with the spring-catch 16, which maintains the front screen panel in operative position while at the same time permitting it to be quickly removed when desirable by merely pushing the frame inwardly against the tension of the spring-catch 16.

The central screen panel includes a metal frame consisting of vertical rails 19 and 21, and top and bottom rails 22 and 23 respectively, with a sheet of screening wire or other suitable screening material 24 attached thereto. 25 designate interlocking pins secured to the vertical rail 19 of the central panel and engageable with openings 26 in a detachable vertical locking post 27, that is thus interlockingly engaged with the central screen panel and when attached to the supporting frame holds the central panel fixed in operative position.

The front vertical rail 21 of the central screen panel has attached thereto interlocking pins 28 that engage openings in the vertical rail 9 of the supporting frame to hold the central panel interlocked therewith. To assemble the central panel, it is first moved endwise within the supporting frame until the pins 28 enter the recesses in the vertical rail 9, following which the vertical locking post 27 is engaged at its upper end with the supporting frame by an endwise movement upwardly, then moved laterally to engage its openings 26 with pins 25, following which the lower end of the post is moved outwardly to engage the supporting frame. The locking post is thus interlocked with the central panel and supporting frame in the manner that will now be described.

To accomplish this, the locking post 27 is provided at its upper and lower ends with pins or projections 29 and 31 respectively, the upper locking pin 29 being engageable with an opening 32 in the top rail 8 of the supporting frame while the lower locking pin 31 is engageable in a slot or recess 33 in the lower rail 7 of the supporting frame. In assembling the locking post 27, its locking pin 29 is first inserted in the opening 32 in the top rail 8 by an upward endwise movement, then moved laterally to engage openings 26 with pins 25, and finally the lower locking pin 31 and the connected lower end of the central panel are moved outwardly to engage pin 31 with recess 33. A slidable catch 34, see Figs. 6 and 7, is then moved laterally from the position shown in Fig. 7 to the position shown in Fig. 8 to retain the central screen panel and locking post in locked position. The slidable catch 34 is mounted on the lower rail 7 of the supporting frame over the slot or recess 32 and includes an opening 35 which uncovers the recess 33 when the catch is positioned as in Fig. 7, the slidable catch being guided and held by slots engaging rivets 36, while 37 designates a finger portion for operating the catch.

After the post 27 is locked in position, the rear screen panel is secured in position in the supporting frame, and in order to effect this, the top rail 8 of the supporting frame is provided with a slot or recess 38 and a slidable catch 39 having an opening 41 to uncover the recess 38 as in Fig. 7, the catch 39 being slidable on the top rail and its movement limited by slots engaging rivets 42, while 43 is a finger piece for operating the catch.

The lower rail 7 is provided with an opening 44, and the rear screen panel includes a vertical rail 45 that carries a locking pin 46 at its lower end engageable with the opening 44 and a locking pin 47 at its upper end that is positionable in the recess or slot 38. The rear screen panel also includes a rear vertical rail 48 and top and bottom rails 49 and 51 respectively that fit within the supporting frame and hold the wire or screening material 52, and with this arrangement, the rear screen panel is assembled by first moving it downwardly to insert the pin 46 in opening 44, then moving the upper end of the screen panel outwardly to permit pin 47 to enter the recess 38 through the opening 41 in the slidable catch, see Fig. 7, and finally moving the slidable catch 39 to the right of the position shown in Fig. 7 until it assumes the position shown in Fig. 5. The rear screen panel in this position is interlocked with the supporting frame and can be swung about the vertical axis determined by the top and bottom pins 47 and 46 respectively. 53 designates a spring-catch secured to the supporting frame and engageable with the vertical rail 48 of the rear panel to hold the latter in operative position while at the same time permitting it to be swung either inwardly or outwardly about its vertical axis, and 54 is a handle for taking hold of the rear panel to effect swinging movement when the driver desires to project an arm through the screen for signaling purposes.

The screening wire may be held within the several screen panels in any suitable fashion, as for instance by providing slots or grooves 55 within the rails of the frames of the panels and maintaining the edges of the screening wire within such slots by means of suitable pins or wedges 56, although the screening wire may be secured within the respective frames in any other convenient fashion.

When the several panels are in operative position as in Fig. 1, the central screen panel is locked in position, the rear screen panel can be enswung inwardly or outwardly about its vertical axis while being maintained in operative position by the spring-catch 53, and the front screen panel is held in operative position but if desirable can be quickly removed by pressing it inwardly against the action of the spring-catch 16 and then withdrawing the panel by a forward movement to disengage its locking pins 15 from the vertical rail 9.

When it is desired to remove the screen panels entirely from the supporting frame, the rear swinging panel is first detached by sliding the top catch 39 laterally to the left with reference to Figs. 1 and 5 to uncover the slot 38, whereupon the pin 47 can be disengaged from the slot by moving the upper part of the panel inwardly of the frame, and the panel can then be entirely disengaged from the frame by a lifting movement to elevate pin 46 from opening 44. After the rear panel is removed, the vertical locking post is detached by first moving the slidable catch 34 to the right of Figs. 6 and 8, thus uncovering the recess or slot 33 and permitting the pin 31 at the lower end of the post 27 to be disengaged from the slot 33 by an inward swinging movement after which the pin 29 is disengaged from the opening 32 by a downward movement. After the locking post 27 is thus removed, the central screen panel is free to be disengaged from the vertical rail 9 by a rearward sliding movement to disengage locking pins 28 from the openings in vertical rail 9.

In this manner, the several screen panels can be arranged within the supporting frame or removed therefrom whenever desirable in a few seconds, and when in place, the entire opening of the door is completely screened and protected.

While the invention has been described with reference to the particular construction herein shown, it is not limited to the details disclosed, and this application is intended to cover such modifications or departures as may come within the purposes of the improvements or the scope of the following claims.

I claim:

1. An automobile screen comprising a generally rectangular supporting frame attachable to the window frame of an automobile door, said supporting frame including top and bottom rails and vertical rails at its front and rear ends, a central screen panel including a vertical rail positionable adjacent and in rear of the front vertical rail of the supporting frame and having means removably and interlockingly engageable with said front vertical rail of the supporting frame, the central screen panel including a second vertical rail, and adjustable means holding said second rail interlocked with said top and bottom rails of the supporting frame.

2. An automobile screen comprising a generally rectangular supporting frame attachable to the window frame of an automobile door, said supporting frame including top and bottom rails and vertical rails at its front and rear ends, a central screen panel including a vertical rail positionable adjacent and in rear of the front vertical rail of the supporting frame and having means removably and interlockingly engageable with said front vertical rail of the supporting frame, the central screen panel including a second vertical rail, a locking post positionable adjacent and in rear of said last mentioned vertical rail of the central screen panel and having means removably and interlockingly engaging the same, said locking post being removably and interlockingly engageable with the top and bottom rails of the supporting frame, and adjustable means holding the locking post interlockingly engaged with said top and bottom rails.

3. An automobile screen comprising a generally rectangular supporting frame attachable to the window frame of an automobile door, said supporting frame including top and bottom rails and vertical rails at its front and rear ends, a central screen panel including a vertical rail positionable adjacent and in rear of the front vertical rail of the supporting frame and having means removably and interlockingly engageable with said front vertical rail of the supporting frame, the central screen panel including a second vertical rail, a locking post positionable adjacent and in rear of said last mentioned vertical rail of the central screen panel and having means removably and interlockingly engaging the same, and adjustable means on said top and bottom rails holding said post interlocked therewith.

4. An automobile screen comprising a generally rectangular supporting frame attachable to the window frame of an automobile door, said supporting frame including top and bottom rails and vertical rails at its front and rear ends, a central screen panel including a vertical rail positionable adjacent and in rear of the front vertical rail of the supporting frame and having means removably and interlockingly engageable with said front vertical rail of the supporting frame, the central screen panel including a second vertical rail, a locking post positionable adjacent and in rear of said last mentioned vertical rail of the central screen panel and having means removably and interlockingly engaging the same, said locking post being removably and interlockingly engageable with the top and bottom rails of the supporting frame, said top rail having a vertical opening therein and said bottom rail having a recess therein, pins carried by the locking post engageable with said opening and recess respectively, and a slidable catch adjustable on the bottom rail to close said recess and hold the locking post engaged with the top and bottom rails.

5. An automobile screen comprising a generally rectangular supporting frame attachable to the window frame of an automobile door, said supporting frame including top and bottom rails and vertical rails at its front and rear ends, a central screen panel including a vertical rail positionable adjacent and in rear of the front vertical rail of the supporting frame and having means removably and interlockingly engageable with said front vertical rail of the supporting frame, said central screen panel including a second vertical rail, a locking post positionable adjacent and in rear of said last mentioned vertical rail of the central screen panel and having means removably and interlockingly engaging the same, said locking post being removably and interlockingly engageable with the top and bottom rails of the supporting frame, an adjustable member holding the locking post interlockingly engaged with said top and bottom rails, and a pivoted rear screen panel having a vertical rail located adjacent to and in rear of said locking post, said last mentioned vertical rail being removably and pivotally supported in said top and bottom rails of the supporting frames.

6. An automobile screen comprising a generally rectangular supporting frame attachable to the window frame of an automobile door, said supporting frame including top and bottom rails and vertical rails at its front and rear ends, a central screen panel including a vertical rail positionable adjacent and in rear of the front vertical rail of the supporting frame and having means removably and interlockingly engageable with said front vertical rail of the supporting frame, said central screen panel including a second vertical rail, a locking post positionable adjacent and in rear of said last mentioned vertical rail of the central screen panel and having means removably and interlockingly engaging the same, said locking post being removably and interlockingly engageable with the top and bottom rails of the supporting frame, an adjustable member holding the locking post engaged with said top and bottom rails, and a pivoted screen panel having a vertical rail located adjacent to and in rear of said locking post and provided with pins at its upper and lower ends, the top rail of the supporting frame having a recess therein and the bottom rail of the supporting frame having an opening therein to receive said top and bottom pins respectively of the locking post, and a slidable catch adjustable on said top rail and operating to close said recess and hold the screen panel in pivotal relation to the supporting frame.

7. An automobile screen comprising a generally rectangular supporting frame attachable to the window frame of an automobile door, said supporting frame including top and bottom rails and vertical rails at its front and rear ends, a central screen panel removably and interlockingly engaged with said top and bottom and front vertical rails, and a rear screen panel removably and pivotally mounted in said top and bottom rails of the supporting frame in rear of the first mentioned panel and having swinging movement inwardly or outwardly.

8. An automobile screen comprising a generally rectangular supporting frame attachable to the window frame of an automobile door, said supporting frame including top and bottom rails and vertical rails at its front and rear ends, a central screen panel removably and interlockingly engaged with said top and bottom and front vertical rails, a rear screen panel removably and pivotally mounted in said supporting frame in rear of the first mentioned panel and having swinging movement inwardly or outwardly, a front screen panel removably and interlockingly engageable with the first mentioned vertical rail forwardly of the central panel and means holding said front screen panel in such interlocked relation.

9. An automobile screen comprising a generally rectangular supporting frame attachable to the window frame of an automobile door, said supporting frame including top and bottom rails and vertical rails at its front and rear ends, a central screen panel including a vertical rail positionable adjacent and in rear of the front vertical rail of the supporting frame and having means removably and interlockingly engageable with said front vertical rail of the supporting frame, said central screen panel including a second vertical rail, a locking post positionable adjacent and in rear of said last mentioned vertical rail of the central screen panel and having means removably and interlockingly engaging the same, said locking post being removably and interlockingly engageable with the top and bottom rails of said supporting frame, adjustable means holding the locking post interlockingly engaged with said top and bottom rails, and a front screen panel including a vertical rail removably and interlockingly engageable with said vertical rail of the supporting frame, the frame of said front screen panel including an inwardly bowed bottom rail.

10. An automobile screen comprising a generally rectangular supporting frame attachable to the window frame of an automobile door, said supporting frame including top and bottom rails and vertical rails at its front and rear ends, a central screen panel including a vertical rail positionable adjacent and in rear of the front vertical rail of the supporting frame and having means removably and interlockingly engageable with said front vertical rail of the supporting frame, said central screen panel including a second vertical rail, a locking post positionable adjacent and in rear of said last mentioned vertical rail of the central screen panel and having means removably and interlockingly engaging the same, said locking post being removably and interlockingly engageable with the top and bottom rails of the supporting frame, an adjustable member holding the locking post interlockingly engaged with said top and bottom rails, a pivoted rear screen panel having a vertical rail located adjacent to and in rear of said locking post, said last mentioned vertical rail being removably and pivotally supported in said top and bottom rails of the supporting frame, and a front screen panel removably and interlockingly engageable with the first mentioned vertical rail forwardly thereof, said last mentioned screen panel including an inwardly bowed bottom rail.

ARNOLD K. ARTHUR.

REFERENCES CITED

The following references are of record in the file of this patent:

UNITED STATES PATENTS

| Number | Name | Date |
|---|---|---|
| 929,304 | Hellwig | July 27, 1909 |
| 963,373 | Kane | July 5, 1910 |
| 2,098,174 | Giberson | Nov. 2, 1937 |
| 2,139,156 | Gill | Dec. 6, 1938 |
| 2,287,331 | Smith | June 23, 1942 |